(12) United States Patent
Cutting

(10) Patent No.: US 7,845,049 B2
(45) Date of Patent: Dec. 7, 2010

(54) DOOR ASSEMBLY FOR MOTOR VEHICLE HAVING MAGNETIZED DOOR BUMPER AND METHODS FOR MAKING SAME

(75) Inventor: Charles Cutting, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 254 days.

(21) Appl. No.: 11/966,121

(22) Filed: Dec. 28, 2007

(65) Prior Publication Data
US 2009/0167052 A1 Jul. 2, 2009

(51) Int. Cl.
*E05F 5/02* (2006.01)
*E05C 17/56* (2006.01)
*B60J 7/00* (2006.01)

(52) U.S. Cl. .................... 16/82; 292/251.5; 296/146.1; 296/155

(58) Field of Classification Search .............. 296/146.1, 296/155, 146.8; 16/82; 292/251.5
See application file for complete search history.

(56) References Cited

U.S. PATENT DOCUMENTS

| 2,815,236 | A | 12/1957 | Lowinski |
| 3,100,664 | A | 8/1963 | Duval |
| 3,258,285 | A | 6/1966 | Smith |
| 3,734,553 | A | 5/1973 | Sugasawara |
| 4,335,911 | A | 6/1982 | Taylor |
| 4,505,502 | A | 3/1985 | Tomita |
| 4,669,766 | A | 6/1987 | Hanchett, Jr. |
| 4,852,919 | A | 8/1989 | Nimee |
| 5,887,917 | A | 3/1999 | Luciana |
| 6,321,411 | B1 | 11/2001 | Ikejiri |

*Primary Examiner*—Joseph D Pape
(74) *Attorney, Agent, or Firm*—Young Basile

(57) ABSTRACT

Door assemblies having magnetized bumpers for use with vehicles are disclosed. The door assemblies comprise a bumper assembly for use in a vehicle having a door that when fully opens contacts an adjacent body panel. The bumper assembly includes a bumper having a base and a distal end opposite the base. The base is configured for fixed attachment to the first exterior surface of a vehicle. The bumper is made of an elastomer and/or plastic and is configured for removable engagement with a second exterior surface. A magnet is provided with at least a portion of the magnet embedded in the body between the distal end and the base. The magnet is located within the bumper sufficiently close to the distal end to exert an attractive magnetic force sufficient to retain a door in contact with the bumper but without the magnet directly touching the door.

27 Claims, 6 Drawing Sheets

DOOR ASSEMBLY FOR MOTOR VEHICLE HAVING MAGNETIZED DOOR BUMPER AND METHODS FOR MAKING SAME

FIELD OF THE INVENTION

The present invention relates to the field of door bumpers and door holders in motor vehicles and in particular to magnetized door holders.

BACKGROUND

To provide for greater convenience, some doors in motor vehicles are now designed to open 180 degrees, so that the outer face of the door is parallel to the adjacent body panel. Some rear doors of motor vehicles such as minivans and sport utility vehicles are designed to open 270 degrees, opening until the outer face of the door is parallel to an adjacent side body panel. To prevent damage in the nature of scrapes and so-called "dings," it is known to provide elastomeric bumpers on the body panels and/or doors so that the door or body panel engages the bumper when the door is fully opened. To hold the door open in this position, it is also known to attach magnets to the exterior surface of such bumpers.

SUMMARY

Embodiments of door assemblies for motor vehicles having magnetized door bumpers are disclosed herein. In one of the disclosed embodiments, a bumper assembly is provided for use in a vehicle having a first exterior surface and a second exterior surface, wherein at least one of the first exterior surface and second exterior surface is movable relative to the other to position the first and second exterior surfaces into and out of contact with each other. The bumper assembly comprises a first bumper having a distal end opposite the base. The base is configured to fixedly attach to the first exterior surface of a vehicle. The first bumper is made of at least one of elastomer and plastic and is configured for removable engagement with the second exterior surface. The bumper assembly also comprises a magnet, at least a portion of which is embedded in the first bumper between the base and the distal end. The magnet is positioned within the first bumper in sufficiently close proximity to the distal end to exert a magnetic force through the distal end sufficient to retain the second exterior surface in contact with the distal end but without touching the second exterior body surface.

In another of the disclosed embodiments, a door assembly for a vehicle is provided. The door assembly includes an exterior panel surface and a first bumper assembly located on the exterior panel surface. The first bumper assembly includes a first bumper having a first base and a first distal end opposite the first base. The first base is configured to fixedly attach to the exterior panel surface. The first bumper is made of at least one of elastomer and plastic. The assembly further comprises a magnet, at least a portion of which is embedded in the first bumper between the first distal end and the first base, and a fastener configured to fixedly attach the first bumper to the exterior panel surface. Further included is a door adjacent to the exterior panel surface and movable between at least a closed position and a fully-open position, wherein at least an exterior door surface contacts the first bumper when the door in the fully-open position. The magnet is positioned within the first bumper to exert an attractive magnetic force sufficient to retain the exterior door surface in contact with the first bumper when the door is in the fully-open position, without the magnet directly touching the door.

In another disclosed embodiment of a door assembly, the door assembly comprises a door movable between at least a closed position and a fully-open position and a first bumper assembly located on the door. The first bumper assembly includes a first bumper having a first base and a first distal end opposite the first base. The first base is configured to fixedly attach to the door, and the first bumper made of at least one of elastomer and plastic. The assembly further comprises a magnet, at least a portion of which is embedded in the first bumper between the first distal end and the first base, and a fastener configured to fixedly attach the first bumper to the door. An exterior panel is included, wherein the first bumper contacts an exterior panel surface of the exterior panel when the door is in the fully-open position. The magnet is positioned within the first bumper to exert an attractive magnetic force sufficient to retain the first bumper in contact with the exterior panel surface when the door is in the fully-open position, without the magnet directly touching the external panel surface.

In yet another embodiment, a vehicle is disclosed having a side panel with an external side surface and a rear-facing door in a frame parallel to the side panel. The rear-facing door pivots around the frame between a closed position and a position that is 270 degrees from the closed position. A first bumper is attached to the side panel on the external side surface, and a second bumper is attached to the rear-facing door at a position in which the first and second bumpers are aligned for engagement when the rear-facing door is in the position that is 270 degrees from the closed position so that the first and second bumpers maintain a gap between the rear-facing door and the external side surface during engagement. There is a side door mounted in the side panel and slidable between a forward position and a rearward position in which at least a portion of the side door is disposed within the gap.

In other embodiments, a method for making a bumper assembly is provided. The method includes providing a mold for the first bumper of the bumper assembly; positioning a magnet within the mold in a position such that the magnet will be completely embedded in the first bumper between the distal end and the base; and injecting a material that is at least one of elastomeric and plastic into the mold.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
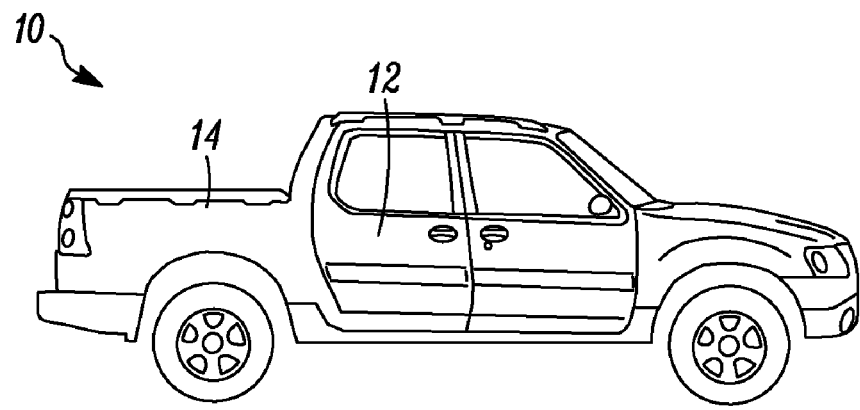
FIG. 1 is a side elevation view of a vehicle in which a side door can be opened 180 degrees.
Figure 2:
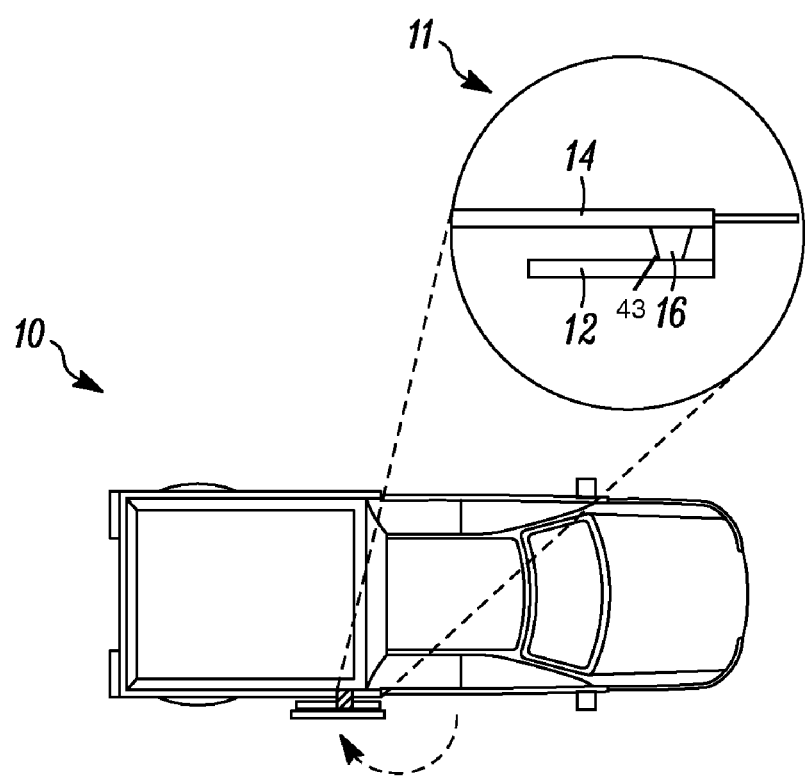
FIG. 2 is an exploded view of the door assembly of FIG. 1, showing the side door in the fully-open position.

FIGS. 1-4 illustrate examples of vehicles that can incorporate embodiments of the door assembly having magnetized door bumpers disclosed herein. Referring to FIG. 1, a vehicle 10 (in this case, a pickup truck) is shown having a door assembly 11 (shown in FIG. 2) comprising side door 12 configured to open 180 degrees, adjacent side panel 14 and bumper assembly 16, shown in FIG. 2. When the side door 12 is in the fully-open position, the door 12 is parallel to the adjacent side panel 14 of the vehicle 10. FIG. 2 is a plan view of the vehicle 10 showing the position of the bumper assembly 16 in relation to the side door 12 and adjacent side panel 14 when the side door 12 is in the fully-open position. As explained below, bumper assembly 14 can protect both door 16 and side panel 18 as well as hold door 16 in its fully-open position.

Figure 3:
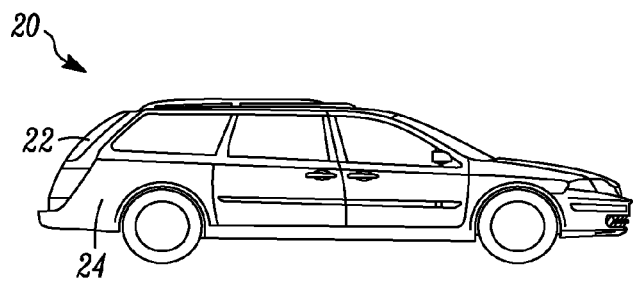
FIG. 3 is a side elevation view of a vehicle in which a rear door can be opened 270 degrees.
Figure 4:
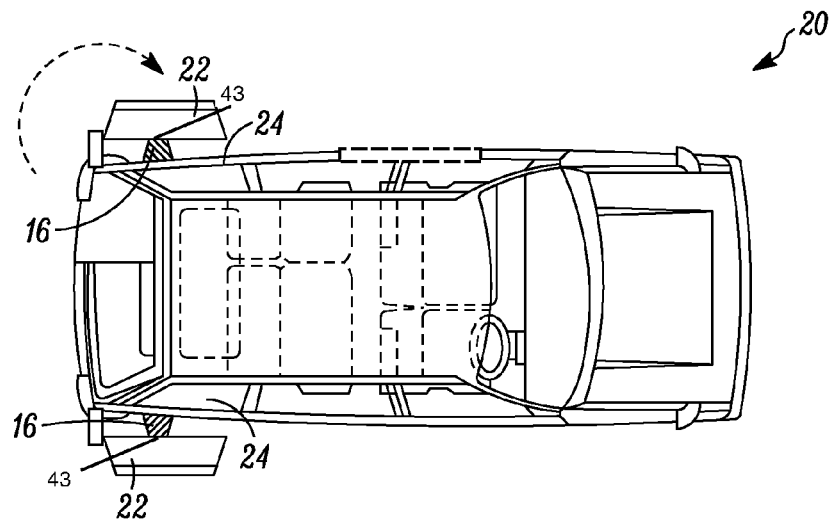
FIG. 4 is a top plan view of the vehicle of FIG. 3, showing the rear door opened 270 degrees.

The present invention can be implemented in different kinds of vehicles. For example, FIG. 3 illustrates a vehicle 20 (in this case, a van) having a rear-facing door 22 configured to open 270 degrees and a side panel 24. FIG. 4 is a plan view of the vehicle 20 showing the position of the bumper assembly 16 in relation to the rear-facing door 22 and adjacent side panel 24 when rear-facing door 22 is in the fully-open position. As explained below bumper assembly 16 can both protect door 22 and side panel 244 as well as hold door 22 in its fully-open position. Embodiments of the present invention can be used with any number of vehicles in addition to those shown, and those shown are illustrated by way of example and not limitation.

Figure 5:
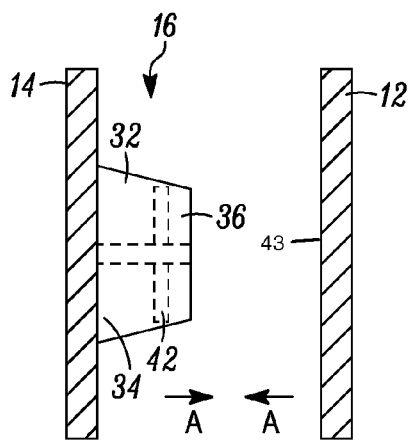
FIG. 5 is a side elevation of a bumper assembly installed in the vehicle of FIG. 1.

FIG. 5 shows an enlarged view of bumper assembly 16 as installed in vehicle 10. Bumper assembly 16 has a bumper 32 having a base 34 and a distal end 36 opposite the base 34. Base 34 is configured to fixedly attach to side panel 14. Bumper 32 includes a magnet 42 positioned between the base 32 and the distal end 36. The distal end 36 is configured to removably engage the side door 12 when side door 12 is moved to its fully open position as shown in FIG. 2. A portion of side door 12 comprises a bumper opposing portion 43, as shown in FIGS. 2 and 5, which is attractive to magnet 42. In this manner, distal end 36 protects side door 12 from banging into side panel 14, while the magnet 42 retains the side door 12 in the fully open position by exerting a magnetic force past the distal end 36 which attracts the bumper opposing portion 43 into contact with the bumper 32. Note that bumper 32 can alternatively be affixed to door 12 and that more than one bumper can be used to provide additional protection. The side panel 14 and/or panel of the door 12 can be reinforced at the location at which the bumper 32 is attached, the location at which the bumper 32 comes in contact with a panel, or both if desired.

The bumper 32, as well as the bumpers of other embodiments disclosed herein, can be made of at least one of an elastomer and a plastic. Non-limiting examples of elastomers suitable for use as the bumper include polymers that are both flexible and elastic. Non-limiting examples of polymers with these characteristics include polyisoprene or natural rubber, polybutadiene, polyisobutylene, and polyurethanes.

Figure 6:
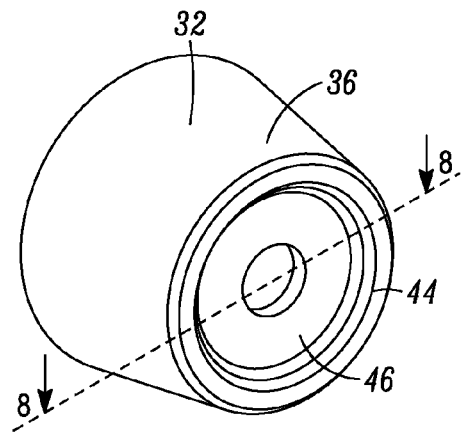
FIG. 6 is a perspective view of the bumper shown in FIG. 5.
Figure 7:
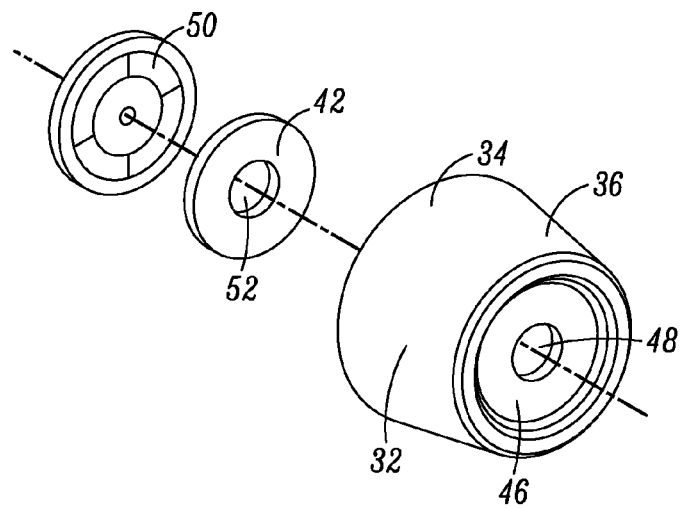
FIG. 7 is an exploded perspective view of the bumper of FIG. 6.

Referring to FIGS. 5-7, bumper 32 can have a magnet 42, at least a portion of which can be embedded in the bumper 32 between base 34 and distal end 36. In this case, magnet 42 is a washer-shaped member having an annual planer surface about a central aperture. Other configurations such as cubes and bars are can also be used. Magnet 42 can be one of a known type of magnet, such as ceramic, alnico, samaruium cobalt, neodymium iron boron. Magnet 42 may be ridged or flexible. In an alternative embodiment, magnet 42 can be replaced by composite of resin and magnetic powders that are formed into bumper 32 by injection molding.

Magnet 42 is positioned within bumper 32 in sufficiently close proximity to distal end 36 so that a magnetic force is exerted through distal end 36 sufficient to retain door 12 in contact with distal end 36 but without touching the door 12. Arrows A represent the direction of the exerted force. Embedding the magnet in the bumper can prevent damage in the nature of scrapes and "dings" on the body panels and/or doors due to contact with the metal magnets. This can also prevent the magnets themselves from being scratched or corroded due to direct exposure to the elements and/or contact with metallic body parts. Additionally, having the magnets embedded in the bumper can eliminate the unpleasant sound of a magnet directly contacting the exterior surface. In this case, distal end 36 forms a layer of material that covers magnet 42 to prevent contact with door 12.

Referring to FIG. 6, it will be seen that distal end 36 of bumper 32 can include a ring-shaped protrusion 44 circumscribing a substantially planar recessed surface 46. Magnet 42 can be embedded within the bumper 32 between the base 34 and the recessed planar surface 46 in a position to permit the magnet 42 to exert a magnetic force through the planar recessed surface 46. In this case, recess surface 46 provides continuous coverage over the entire outward facing planar surface of magnet 42. Alternatively, recessed surface 46 can have holes, slots or other openings (not shown) to provide a protective barrier between magnet 42 and side door 12 without encasing all of magnet 42.

Referring to FIG. 7, bumper 32 has a bore 48 extending from the distal end 36 through the recessed planar surface 46 and the base 34. Bore 48 is sized and configured to accommodate a removable fastener (not shown) such as a screw or bolt, for attaching the bumper to side panel 14. A washer 50 near the base 34 can be used to secure the fastener. Magnet 42 is positioned within bumper 32 so that central aperture 52 of magnet 42 is coaxial with bore 48.

Figure 8:
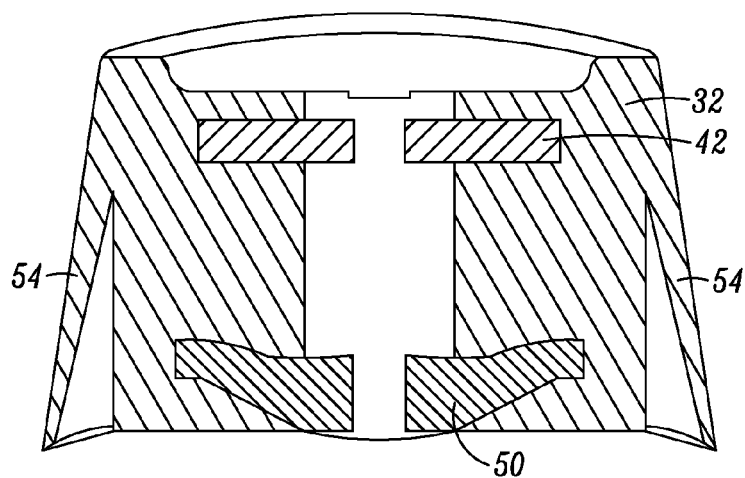
FIG. 8 is a cross sectional view of the bumper of FIG. 6, taken along the lines 8-8.

Referring to FIG. 8, a cross-sectional view of FIG. 6 taken along the line 8-8, magnet 42 and washer 50 are irremovably over-molded within the bumper 32. This bumper configuration with the over-molded magnet can decrease assembly time of the bumper assembly, increasing efficiency. These means of embedding the magnet within the bumper are provided by way of example and not limitation, and other suitable methods may be used. As best seen in FIG. 8, the sidewalls of bumper 32 can define a skill 54 circumscribing the base 34 and extending at an angle from the distal end 36. Skirt 54 can form a seal between the bumper 32 and the side panel 14, preventing ingress of water, dirt and the like.

Bumper assembly 16 of the first embodiment can be incorporated into a wide range of vehicle designs on either vehicle panels or vehicle doors. The shallow recess of the first embodiment is suitable for use on vehicles with sliding doors, as the shallow recess can provide adequate clearance for such doors when the bumper is placed on the adjacent side panel.

Figure 9:
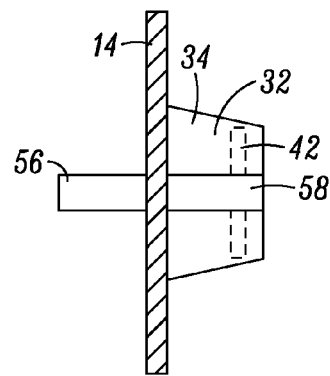
FIG. 9 is a side elevation of a bumper with a fastener in accordance with embodiments herein.

FIG. 9 illustrates an alternative embodiment of bumper 32, in which a fastener 56 is integrally molded into bumper 32 and protrudes from base 34. Fastener 56 includes a distal end 58 adapted to receive a screw driver or other tool to permit fastener 56 to be secured to a body element (in this case side panel 14). The bumper 32 can be positioned flush against side panel 14. Fastener 56 is sized to fit through the bore 48 of the bumper 32 and the aperture 52 of the magnet 42 if required. The fastener 56 can be a screw or bolt, for example. A washer (not shown) near the base 34 can be used to secure the fastener. However, these fasteners are provided by way of example and not limitation, and other suitable fasteners known in the art may be used.

Figure 10:
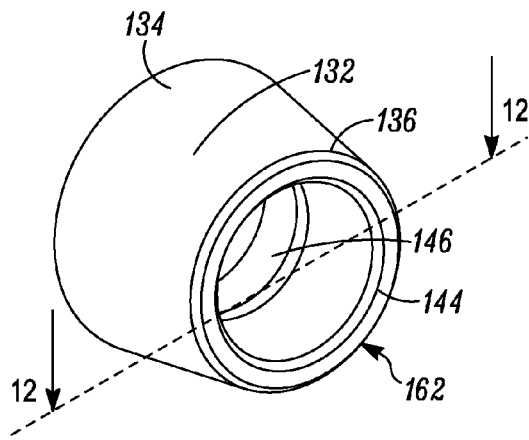
FIG. 10 is a perspective view of a bumper in accordance with a second embodiment.
Figure 11:
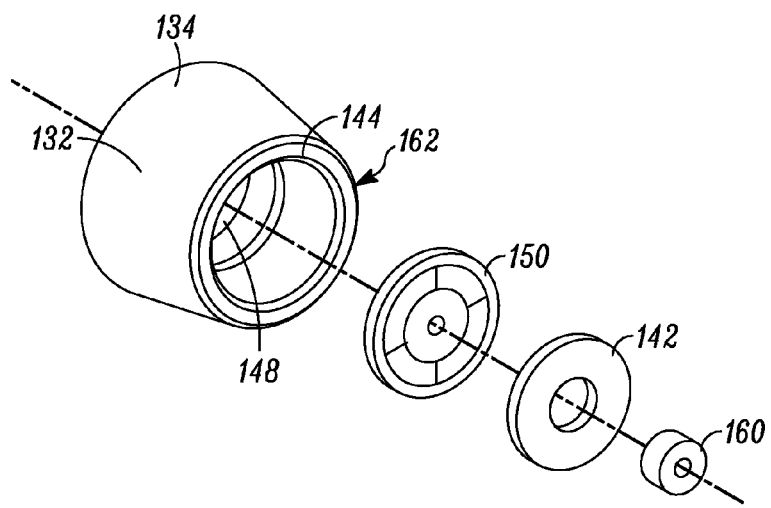
FIG. 11 is an exploded perspective view of the bumper of FIG. 10.

FIGS. 10-12 illustrate a bumper 132 in accordance with an alternative embodiment. Where the alternative embodiment is the same as the first embodiment, the description will refer to the details previously described in accordance with the first embodiment. Where the second embodiment is different from the first, the differences will be described in detail.

Bumper 132 has a base 134 and a distal end 136 opposite base 134. The base is configured to fixedly attach to either a vehicle door or a vehicle side panel, as in the first embodiment. The distal end 136 is configured to removably engage an exterior surface of a vehicle (such as door 12 or side panel 14) when the vehicle door is moved into contact relative to the vehicle side panel. As shown, the distal end 136 of the bumper 132 can include a ring-shaped protrusion 144 circumscribing a substantially planar recessed surface 146. However, in the second embodiment, the recessed planar surface 146 is disposed more than 6 mm inboard of an outboard-most point 162 of the ring-shaped protrusion 144.

Magnet 142 can be embedded within the bumper 132 between the base 134 and the recessed planar surface 146 in a position to permit the magnet 142 to exert a magnetic force through the planar recessed surface 146. In this case, recess surface 146 provides continuous coverage over the entire outward facing planar surface of magnet 142. Alternatively, recessed surface 146 can have holes, slots or other openings (not shown) to provide a protective barrier between magnet 142 and side door 12 without encasing all of magnet 142.

Bumper 132 has a bore 148 extending from the distal end 136 through the recessed planar surface 146 and the base 134. Bore 148 is sized and configured to accommodate a removable fastener (not shown) such as a screw or bolt, for attaching the bumper to side panel 14. A washer 150 near the base 134 can be used to secure the fastener. Magnet 142 is positioned within bumper 132 so that central aperture 152 of magnet 142 is coaxial with bore 148.

Due to the extended distance between the out-board most point 162 and the recessed planar surface 146 in the second embodiment, magnet 142 can alternatively be inserted into the recessed area encompassed by the ring-shaped protrusion 144. In FIG. 11, the magnet 142 can be inserted between a washer 150 and a nut 160 through the recessed area of the ring-shaped protrusion 144, wherein the washer 150, nut 160 and magnet 142 are all lower than the plane of the ring-shaped protrusion 144 so as not to come in contact with side door 12.

Figure 12A:
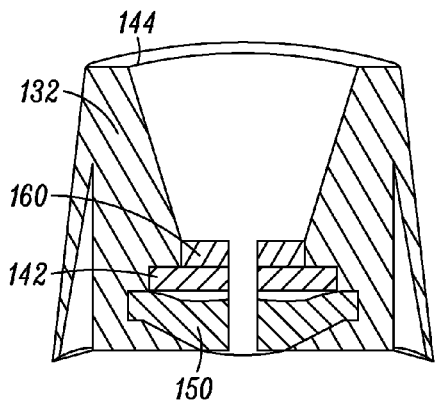
FIG. 12A is a cross sectional view of the bumper of FIG. 11.
Figure 12B:
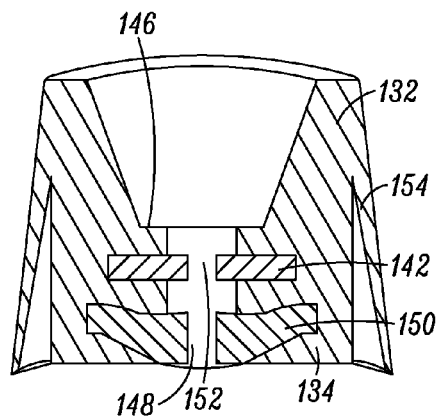
FIG. 12B is a cross sectional view of the bumper of FIG. 10 taken along the lines 12-12.

FIG. 12A is a cross-sectional view of bumper 132 with washer 150, magnet 142 and nut 160 inserted in the recessed area between the ring-shaped protrusion 144 and the recessed surface 146. FIG. 12B is a cross-sectional view taken along line 12-12 of FIG. 10 with magnet 142 inserted into the bumper material after the material is poured into a mold, so that magnet 142 is irremovably over-molded within the bumper 132. The magnet 142 can be embedded or over-molded within bumper 132 between base 134 and recessed planar surface 146. The aperture 152 of the magnet 142 is shown coaxial with a bore 148 of the bumper 132. A washer 150 is included for use in attachment of the bumper to the side panel 14.

In FIGS. 12A and 12B, bumper 132 can include a skirt 154 circumscribing the base 134 and extending at an angle from the distal end 136. The diameter of skirt 154 can be larger than the diameter of circular distal end 136, with the side walls of the skirt 154 tapering outward from distal end 136 to the plane of base 134. Skirt 154 can form a seal between the bumper 132 and the side panel 14, preventing ingress of water, dirt and the like. However, this shape is provided by way of example and not limitation, and other suitable shapes may be used.

Bumper 132 of the second embodiment can be incorporated into a wide range of vehicle designs on either vehicle panels or vehicle doors. For vehicle designs in which clearance is an issue, the panel or door can be embossed with an indentation where the bumper 132 is attached, providing for the desired clearance.

Figure 13:
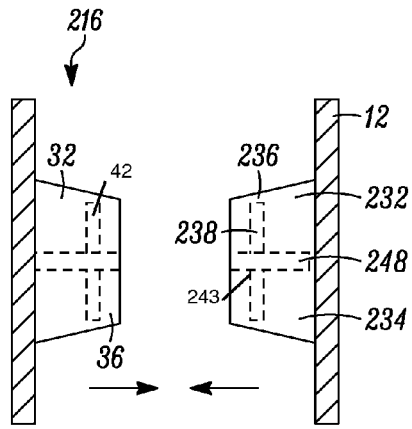
FIG. 13 is a side elevation of a bumper assembly having first and second bumpers in accordance with a third embodiment of the invention.

FIG. 13 illustrates a bumper assembly in accordance with another embodiment. Bumper assembly 216 includes bumper 32 (as described above) and a second bumper 232. The construction of bumper 232 is substantially the same as bumper 32. Bumper 232 has a base 234 and a distal end 236 opposite the base 234. Bumper 232 has a bore 248 extending at least a partial way through its base 234, bore 248 being sized and configured to accommodate a removable fastener for attaching bumper 232 to door 12 by means of a bolt or other suitable fastener (not shown). Bumper 232 includes an annular ferrous washer or insert 238 in lieu of magnet 42. The insert 238 comprises a bumper opposing portion 243 which is attractive to magnet 42. Bumper 232 is attached to door 12 and positioned so that when door 12 is in its fully opened position, the distal end 236 of bumper 232 is aligned for engagement with the distal end 36 of bumper 32. When the distal end 236 of bumper 232 is proximate to the distal end 36 of bumper 32, the magnet 42 retains the side door 12 in the fully open position by exerting a magnetic force past the distal end 36 which attracts the bumper opposing portion 243.

Alternatively, bumper 232 can contain a magnet 42 but in that case its polarity should be positioned such that it exerts an attractive force on magnet 42 when door 12 is fully-opened and distal ends 36 and 236 are aligned.

At least a portion of the insert 238 can be embedded in the second bumper 232 between the base 234 and the distal end 236. The insert 238 is positioned within the bumper 232 so that the insert 238 does not directly contact the distal end 36 of the bumper 32 when the bumpers 32, 232 contact each other.

Bumper 232 can be formed via injection molding with insert 238 positioned in the mold prior to injection of plastic material, so that insert 238 is irremovably molded within the bumper 232. An additional washer (not shown) can also be in-molded to help anchor the fastener. These means of embedding the insert within the bumper are provided by way of example and not limitation, and other suitable methods may be used.

Bumper 232 can include a ring-shaped protrusion circumscribing a substantially planar recessed surface. Insert 238 can be embedded within the bumper 232 between the base 234 and the recessed planar surface in a position to permit the magnet 42 of bumper 32 to exert a magnetic force through the planar recessed surface of bumper 232.

In an alternative embodiment of bumper assembly 216, bumper 32 is attached to door 12 and bumper 232 can be attached to side panel 14.

Figure 14A:
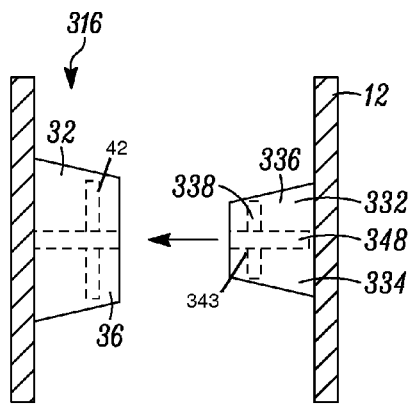
FIG. 14A is a side elevation view of a bumper in accordance with a fourth embodiment.

FIG. 14A illustrates a bumper assembly in accordance with another embodiment. Bumper assembly 3-16 includes bumper 32 (as described above) and a smaller bumper 332. The construction of bumper 332 is substantially the same as bumper 32. Bumper 332 has a base 334 and a distal end 336 opposite the base 334. Bumper 332 has a bore 348 extending at least a partial way through its base 334, bore 348 being sized and configured to accommodate a removable fastener for attaching bumper 332 to door 12 by means of a bolt or other suitable fastener (not shown). Bumper 332 includes an annular ferrous washer or insert 338 in lieu of magnet 42. The insert 338 comprises a bumper opposing portion 343 which is attractive to magnet 42. Bumper 332 is attached to door 12 and positioned so that when door 12 is in its fully opened position, the distal end 336 of bumper 332 is aligned for engagement with the distal end 36 of bumper 32. When the distal end 336 of bumper 332 is proximate to the distal end 36 of bumper 32, the magnet 42 retains the side door 12 in the fully open position by exerting a magnetic force past the distal end 36 which attracts the bumper opposing portion 343.

Figure 14B:
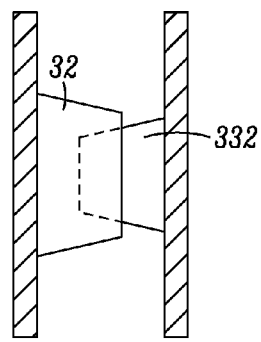
FIG. 14B is a side elevation view of the bumper of FIG. 14A in operation.

The distal end 36 of bumper 32 of has a first distal diameter D1 and a first distal recess. The distal end 336 of smaller bumper 332 has a second distal diameter D2 and a second distal recess. In this embodiment, the first and second distal diameters D1, D2 are of different sizes such that the distal end 336 of smaller bumper 332 fits in nesting engagement with the distal end 36 of bumper 32. The bumpers 32, 332 are shown in nesting engagement in FIG. 14B.

As in the first embodiment, the bumper assembly 16 and the smaller bumper 332 can be attached on the opposite surface. For example, the bumper assembly 16 can be fixedly attached to side panel 14 and the smaller bumper 332 may be fixedly attached to door 12.

Bumper 332 can be formed via injection molding with insert 338 positioned in the mold prior to injection of plastic material, so that insert 338 is irremovably molded within the bumper 332. An additional washer (not shown) can also be in-molded to help anchor the fastener. These means of embedding the insert within the bumper are provided by way of example and not limitation, and other suitable methods may be used.

This embodiment can combine the bumper 132 of the second embodiment with the smaller bumper 332 of this embodiment, wherein the distal end 136 of the bumper 132 has a first distal diameter and a first distal recess. The distal end 336 of the smaller bumper 332 has a second distal diameter and a second distal recess. In this alternative embodiment, the first, and second distal diameters are of different sizes such that one of the distal ends 136, 336 fits in nesting engagement with the other's distal recess.

The nesting engagement of the bumpers can protect the external surfaces of the vehicle, can hold one of the external surfaces in the fully-open position, and can maintain the engagement when a downward force is placed on one of the external surfaces. The downward force can be applied when a load is placed inside the vehicle in such a position as to alter the position of the side panel. Examples of this might occur when loading the back of a truck or sport utility vehicle.

Figure 15:
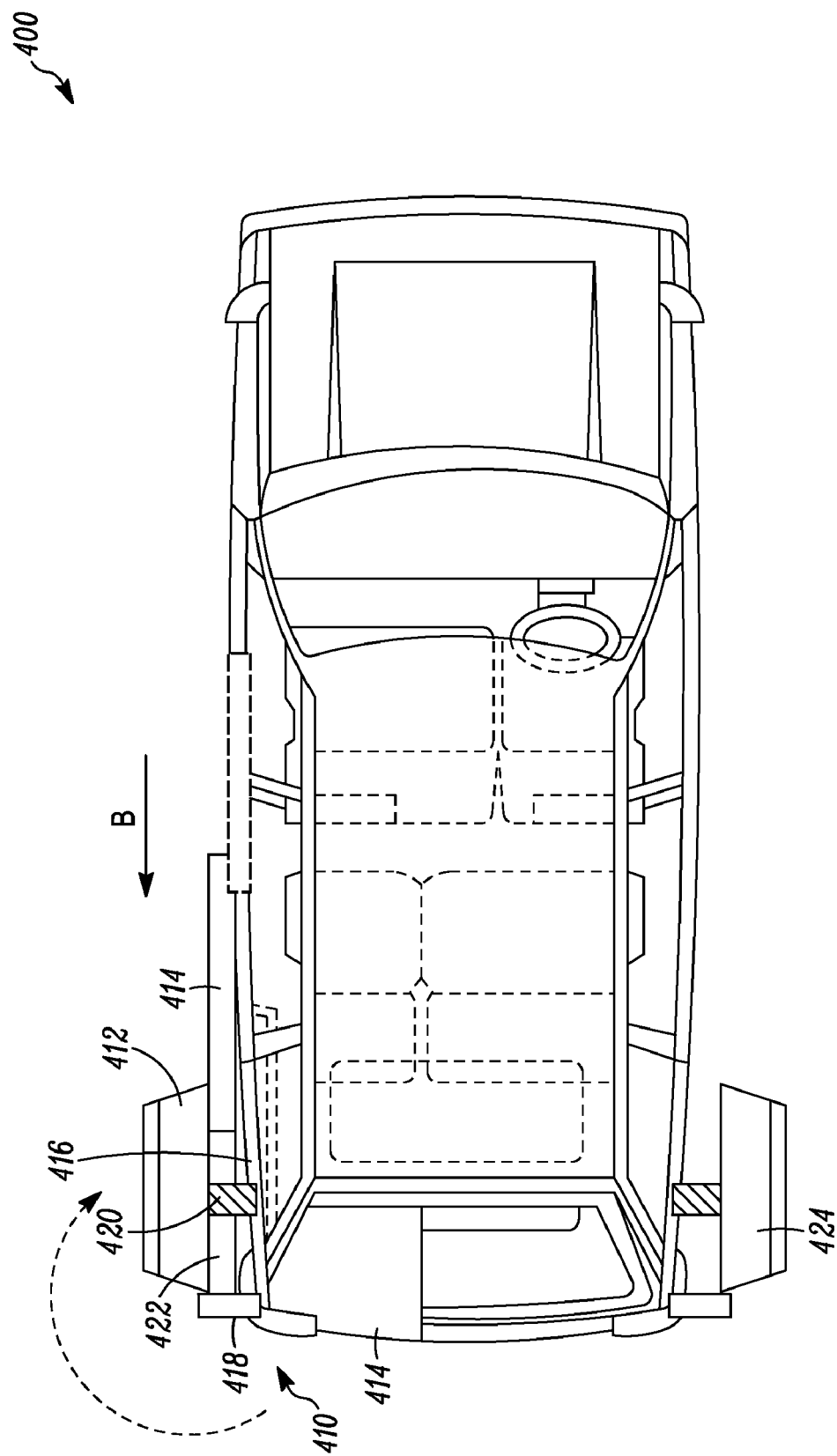
FIG. 15 is a plan view of the vehicle of FIG. 3, showing the rear door opened 270 degrees and the sliding side door in the open position.

FIG. 15 illustrates a vehicle 400 having at least one door assembly in accordance with another embodiment of the invention. Door assembly 410 includes at least one rear-facing door 412 and at least one sliding door 414. Rear-facing door 412 is in a frame 414, the door frame 414 being perpendicular (from a plan view) to side panel 416. The rear-facing door 412 is also perpendicular to the side panel 416 when in the closed position. The rear-facing door 412 pivots around the side 418 of the frame 414 adjacent to the side panel 416 between a closed position and a fully-open position, which is 270 degrees from the closed position. One bumper of the door assembly 410 can be fixedly attached to the side panel 416 and a second bumper of the door assembly 410 can be fixedly attached to rear-facing door 412 at a position in which the first and second bumpers 420 are aligned for engagement when the rear-facing door 412 is in the fully-open position that is 270 degrees from the closed position so that the first and second bumpers 420 maintain a gap 422 between the rear-facing door 412 and the side panel 416 during engagement. The sliding door 414 is mounted in the side panel 416 and slidable between a forward position and a rearward position, the direction of which is shown by the arrow B, in which at least a portion of the sliding door 414 is disposed within the gap 422. A second door assembly 410 can be incorporated on a second rear-facing door 424 of the vehicle 400. The second rear-facing door 424 can alternatively incorporate any of the embodiments of bumper assemblies taught herein.

The bumper assembly used in this vehicle embodiment can be any one of the embodiments disclosed herein and can be utilized on one or all doors of the vehicle. Further, like bumpers can be used on both a door and a side panel.

A method for making any one of the bumper assemblies taught herein is disclosed. The method comprises providing a mold for the bumper, positioning a magnet within the mold in a position such that the magnet will be embedded in the bumper between the distal end and the base at the proper location to allow for the magnet to exert the required force, and injecting a material that is at least one of elastomeric and plastic into the mold. The method can further comprise positioning a fastener in the mold in a position such that the faster will be partially embedded in the bumper with at least a portion of the fastener extending from the base of the bumper prior to injecting the material.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A bumper assembly for use in a vehicle, the vehicle having a first panel with a first exterior surface and a second panel with a second exterior surface, wherein at least one of the first exterior panel and second exterior panel is movable relative to the other to position the first and second exterior surfaces into and out of proximal and opposing relationship with each other, the bumper assembly comprising:

a first bumper having a base configured to be fixedly attached to the first panel and a distal end opposite the base;

a magnet positioned in the first bumper between the base and the distal end, with at least a portion of the magnet embedded in the first bumper; and a first bumper opposing portion on the second panel which is attractive to the magnet,
wherein the magnet is positioned within the first bumper in sufficiently close proximity to the distal end to exert a magnetic force past the distal end sufficient to retain the first bumper opposing portion proximate to the distal end but without the magnet touching the first bumper opposing portion.

2. The bumper assembly of claim 1, wherein the first bumper is made of at least one of elastomer and plastic, and the magnet is irremovably molded within the first bumper.

3. The bumper assembly of claim 1, wherein the first bumper further comprises a bore extending therethrough from the distal end through the base, the bore sized and configured to accommodate a removable fastener suitable to attach the first bumper to the first panel.

4. The bumper assembly of claim 3, wherein the magnet is a ring defining an aperture, and the magnet is positioned within the first bumper with the aperture of the magnet coaxial with the bore.

5. The bumper assembly of claim 1, further comprising a fastener, at least a portion of which is embedded in the first bumper, the fastener extending from the base to attach the first bumper to the first panel.

6. The bumper assembly of claim 1, wherein the distal end includes a ring-shaped protrusion circumscribing a substantially planar recessed surface, wherein the magnet is embedded within the first bumper between the base and the planar recessed surface in a position to permit the magnet to exert a magnetic force through the planar recessed surface.

7. The bumper assembly of claim 6, wherein the first bumper further comprises a bore extending therethrough from the planar recessed surface through the base, the bore sized and configured to accommodate a removable fastener suitable for attaching the first bumper to the first panel.

8. The bumper assembly of claim 7, wherein the magnet includes an annular planar surface having an aperture therethrough, the magnet positioned within the first bumper so that the magnet's annular planar surface is parallel to the planar recessed surface and the magnet's aperture is coaxial with the bore.

9. The bumper assembly of claim 6, wherein the planar recessed surface is disposed more than 6 mm inboard of an outboard-most point of the ring-shaped protrusion.

10. The bumper assembly of claim 1, further comprising a second bumper fixed to the second panel, wherein the second bumper includes the first bumper opposing portion, and wherein the second bumper and the first bumper are aligned and configured to prevent the first exterior surface from directly contacting the second exterior surface when the first panel and second panel are moved relative to each other.

11. The bumper assembly of claim 10, wherein the second bumper has a second base configured to fixedly attach to the second panel, a second distal end opposite the second base, and an insert comprising the first bumper opposing portion.

12. The bumper assembly of claim 1, wherein one of the first panel and the second panel is a closure panel adjacent to the other of the first panel and the second panel and is movable between at least a closed position and a fully-open position, wherein the first bumper opposing portion contacts the first bumper when the closure panel is in the fully-open position.

13. The bumper assembly of claim 12, further comprising a second bumper fixed to the second panel and including the first bumper opposing portion, wherein the first bumper and the second bumper are aligned to contact each other when the closure panel is in the fully-open position.

14. The bumper assembly of claim 13, wherein the second bumper has a second base configured to fixedly attach to the second panel, a second distal end opposite the second base, and an insert comprising the first bumper opposing portion.

15. The bumper assembly of claim 14, wherein the insert is at least one of a ferrous material and a magnetic material attractive to the magnet of the first bumper assembly.

16. The bumper assembly of claim 14, wherein the first distal end has a recess sized to fit in nesting engagement with the second distal end.

17. The bumper assembly of claim 14, wherein the second distal end has a recess sized to fit in nesting engagement with the first distal end.

18. A method for making the bumper assembly of claim 1, comprising:
providing a mold for the first bumper;
positioning a magnet within the mold in a position such that the magnet will be embedded in the first bumper between the distal end and the base; and
injecting a material that is at least one of elastomeric and plastic into the mold.

19. The method of claim 18, further comprising:
positioning a fastener in the mold in a position such that the fastener will be partially embedded in the first bumper with at least a portion of the fastener extending from the base of the first bumper prior to injecting the material.

20. The bumper assembly of claim 1, wherein one of the first panel and the second panel is a closure panel movable between at least a closed position and a fully-open position.

21. A vehicle comprising:
a side panel with an external side surface;
a rear-facing door in a frame perpendicular to the side panel, wherein the rear-facing door pivots around the frame between a closed position and a fully-open position, the fully-open position being 270 degrees from the closed position;
a first bumper attached to the side panel on the external side surface;
a second bumper attached to the rear-facing door at a position in which the first and second bumpers are aligned for engagement when the rear-facing door is in the fully-open position, wherein the first and second bumpers are sized such that one of the first and second bumpers fits in nesting engagement with the other and sized so that the first and second bumpers maintain a gap between the rear-facing door and the external side surface during engagement; and
a side door mounted in the side panel and slidable between a forward position and a rearward position in which at least a portion of the side door is disposed within the gap.

22. The vehicle of claim 21, wherein one of the first bumper and second bumper comprises a base and a magnet, at least a portion of the magnet embedded within the base, and the other of the first bumper and second bumper comprises a base and an insert, at least a portion of the insert embedded within the base.

23. The bumper assembly of claim 1, wherein the first bumper opposing portion is a portion of the second panel.

24. The bumper assembly of claim 11, wherein the second panel is a side panel of the vehicle and the first panel is a rear-facing door in a frame perpendicular to the side panel, wherein the rear-facing door pivots around the frame between a closed position and a fully-open position, the fully-open position being 270 degrees from the closed position, and wherein when the rear-facing door is in the fully-open position the first and second bumpers maintain a gap between the rear-facing door and the side panel during engagement.

25. A vehicle comprising the bumper assembly of claim 24 and further comprising:

a side door mounted in the side panel and slidable between a forward position and a rearward position in which at least a portion of the side door is disposed within the gap.

26. The bumper assembly of claim 24, wherein the first distal end has a recess sized to fit in nesting engagement with the second distal end.

27. The bumper assembly of claim 24, wherein the second distal end has a recess sized to fit in nesting engagement with the first distal end.

* * * * *